Patented Apr. 23, 1935

1,998,551

UNITED STATES PATENT OFFICE 1,998,551

MERCERIZING PROCESS

Herbert Mahn, Dessau in Anhalt, Germany, assignor to I. G. Farbenindustrie Aktiengesellschaft, Frankfort-on-the-Main, Germany No Drawing. Application March 25, 1932, Serial No. 601,303. In Germany April 1, 1931

7 Claims. (Cl. 8—20)

My present invention relates to a mercerizing process and has for its object to provide a new process of this kind.

For the mercerization of textile materials solutions of fixed alkalies are generally used which, in order to prevent the fiber from being detrimentally affected when impregnated therewith, have to be washed out as quickly and completely as possible. This operation must be effected very carefully and uniformly and causes a considerable loss of mercerizing agents.

This invention is based on the observation that liquid ammonia also has a mercerizing action on cellulose hydrate for instance viscose artificial silk. The action of liquid ammonia on the material to be treated is considerably feebler than that of a caustic alkali solution, but involves some advantages. For instance, the fibers are not so easily damaged and it is not necessary to eliminate the mercerizing agent from the fiber with the same speed and to the same extent.

Since the materials thus treated can be freed very easily from the liquid ammonia by evaporation, especially in a vacuum, it is practically impossible for them to be affected detrimentally by the mercerizing agent, and the latter can be much more easily recovered than is the case with fixed alkalies.

The term mercerization in the sense of this process comprises the improvement as regards luster and the strength of threads of cellulose hydrate artificial silk, particularly of the ordinary viscose silk and the viscose silk of high tenacity, the latter being mercerized for increasing its extensibility and its dyeing properties.

The improvements of hanks or tissues of artificial silk by the after-treatment with liquid ammonia is, for instance, effected by immersing the material for some minutes without tension or preferably under slight tension in liquid ammonia. In the case of webs, the tension can be afforded by pairs of rollers. When mercerizing threads in hank form, I may proceed in the manner known from drying hanks of artificial silk under tension. The car on which the hanks are suspended is introduced into a vessel of suitable dimension, then the ammonia flows in, eventually under pressure, and is after the treatment pressed back into the supply vessel. Instead of employing tension artificially, one may utilize the contraction occurring in the mercerizing operation. When the main quantity of the adhering ammonia has drained off or has been expressed from the silk, the remaining ammonia can quickly be eliminated by suction in a vacuum. When working at ordinary pressure it is, of course, necessary that the temperature of the ammonia should be maintained below the boiling point of ammonia.

The following examples serve to illustrate my invention.

(1) Artificial silk from viscose consisting of cellulose hydrate and having a tensile strength of 167 grams per 100 deniers and an extensibility of 13.6 per cent, is reeled in the usual manner. The silk is then while remaining on the reel introduced into liquid ammonia at a temperature of about $-33°$ C. and left therein for about one hour. After this period the hanks of artificial silk are removed from the mercerizing bath and the adhering ammonia is removed by evaporation. The threads show after the treatment a tensile strength of 162 grams per 100 deniers and an extensibility of 18.2 per cent.

(2) An artificial silk from viscose having a tensile strength of 312 grams per 100 deniers and an extensibility of 6.4 per cent shows after the same treatment as in the foregoing example, but performed at $-50°$ C., a tensile strength of 324 grams per 100 deniers and an extensibility of 8.4 per cent.

(3) An artificial silk from viscose having a tensile strength of 167 grams per 100 deniers and an extensibility of 15.3 per cent shows after the same treatment as described in Example 1, but operated at $+15°$ C. under pressure, a tensile strength of 146 grams per 100 deniers and an extensibility of 25 per cent.

My invention is not limited to the foregoing examples nor to the specific details given therein. Other modes of execution are possible and I contemplate as included within my invention all such modifications as fall within the scope of the appended claims. Other textile materials than artificial silk from viscose consisting of cellulose or cellulose hydrate may be treated according to my invention and will show a similar effect.

What I claim is:

1. The process which comprises treating a textile material comprising cellulose hydrate with liquid ammonia.

2. The process which comprises treating a textile material comprising cellulose hydrate with liquid ammonia at a temperature between $+15°$ C. and the freezing point of ammonia.

3. The process which comprises treating a textile material comprising cellulose hydrate with liquid ammonia at a temperature between $+15°$ C. and the freezing point of ammonia while stretching said material.

4. The process which comprises treating viscose silk with liquid ammonia at a temperature between +15° C. and the freezing point of ammonia while stretching said viscose silk.

5. The process which comprises treating a textile material containing cellulose hydrate with liquid ammonia at a temperature between −33° C. and +15° under pressure.

6. The process which comprises treating a textile material containing cellulose hydrate with liquid ammonia at a temperature between −33° C. and +15° C. under pressure while stretching said material.

7. The process which comprises treating viscose silk with liquid ammonia at a temperature between −33° C. and +15° C. under pressure while stretching said material.

HERBERT MAHN.